US006763277B1

(12) United States Patent
Allen, Jr. et al.

(10) Patent No.: US 6,763,277 B1
(45) Date of Patent: Jul. 13, 2004

(54) METHOD AND APPARATUS FOR PROACTIVE DISPATCH SYSTEM TO IMPROVE LINE BALANCING

(75) Inventors: Sam H. Allen, Jr., New Braunfels, TX (US); Michael R. Conboy, Austin, TX (US); Jason A. Grover, Austin, TX (US)

(73) Assignee: Advanced Micro Devices, Inc., Austin, TX (US)

(*) Notice: Subject to any disclaimer, the term of this patent is extended or adjusted under 35 U.S.C. 154(b) by 135 days.

(21) Appl. No.: 09/906,519

(22) Filed: Jul. 16, 2001

(51) Int. Cl.[7] ............................................. G06F 19/00
(52) U.S. Cl. .................... 700/100; 700/121; 700/97; 700/101
(58) Field of Search ....................... 700/28–31, 83, 700/86, 87, 89, 90–121; 705/7–10, 28, 29

(56) References Cited

U.S. PATENT DOCUMENTS

| | | | | |
|---|---|---|---|---|
| 4,887,218 A | * | 12/1989 | Natarajan ................... | 364/468 |
| 5,321,620 A | * | 6/1994 | Tanaka et al. .............. | 364/468 |
| 5,546,326 A | * | 8/1996 | Tai et al. .................... | 364/552 |
| 5,586,039 A | * | 12/1996 | Hirsch et al. ........... | 364/468.01 |
| 5,721,686 A | * | 2/1998 | Shahraray et al. ..... | 364/468.08 |
| 5,737,228 A | * | 4/1998 | Ishizuka et al. ....... | 364/468.08 |
| 5,748,478 A | * | 5/1998 | Pan et al. .............. | 364/468.05 |
| 5,818,716 A | * | 10/1998 | Chin et al. ............. | 364/468.06 |
| 5,889,673 A | * | 3/1999 | Pan et al. .............. | 364/468.03 |
| 5,971,584 A | * | 10/1999 | Iriuchijima et al. .... | 364/468.07 |
| 6,128,588 A | * | 10/2000 | Chacon ........................ | 703/6 |
| 6,470,231 B1 | * | 10/2002 | Yang et al. ................. | 700/108 |
| 6,584,369 B2 | * | 6/2003 | Patel et al. ................. | 700/100 |
| 2002/0032495 A1 | * | 3/2002 | Ozaki ......................... | 700/108 |
| 2002/0147960 A1 | * | 10/2002 | Jevtic et al. ................. | 716/19 |
| 2003/0153995 A1 | * | 8/2003 | Karasawa .................... | 700/101 |

OTHER PUBLICATIONS

The American Heritage Dictionary of the English Language 2000, 4th edition, Houghton Muifflin Company.*
Sivakumar, Optimization of cycle time and utilization in semiconductor test manufacturing using simulation based, on–line, near–real–time scheduling system 1999, Proceedings of the 1999 Winter Simulation Conference.*
Hung, "Dispatching rules using flow time predictions for semiconductor wafer fabrications" 2002, Journal of the Chinese Institute of Industrial Engineers, vol. 19, no. 1, pp. 67–74.*

* cited by examiner

Primary Examiner—Albert W. Paladini
Assistant Examiner—Sean Shechtman
(74) Attorney, Agent, or Firm—Williams, Morgan & Amerson, P.C.

(57) ABSTRACT

A method, apparatus, and system is provided for a proactive dispatch system to improve line balancing. At least one request for processing a semiconductor wafer is received. A line-balancing analysis based upon the request is performed. At least one semiconductor wafer based upon the line-balancing analysis is processed.

27 Claims, 9 Drawing Sheets

METHOD AND APPARATUS FOR PROACTIVE DISPATCH SYSTEM TO IMPROVE LINE BALANCING

BACKGROUND OF THE INVENTION

1. Field of the Invention

This invention relates generally to semiconductor manufacturing, and, more particularly, to a method and apparatus for performing a proactive processing line control to improve line balancing in semiconductor manufacturing.

2. Description of the Related Art

The technology explosion in the manufacturing industry has resulted in many new and innovative manufacturing processes. Today's manufacturing processes, particularly semiconductor manufacturing processes, call for a large number of important steps. These process steps are usually vital, and therefore, require a number of inputs that are generally fine-tuned to maintain proper manufacturing control.

The manufacture of semiconductor devices requires a number of discrete process steps to create a packaged semiconductor device from raw semiconductor material. The various processes, from the initial growth of the semiconductor material, the slicing of the semiconductor crystal into individual wafers, the fabrication stages (etching, doping, ion implanting, or the like), to the packaging and final testing of the completed device, are so different from one another and specialized that the processes may be performed in different manufacturing areas or locations that contain different control schemes.

Generally, a set of processing steps is performed on a group of semiconductor wafers, sometimes referred to as a lot, using a semiconductor manufacturing tool called an exposure tool or a stepper. Typically, an etch process is then performed on the semiconductor wafers to shape objects on the semiconductor wafer, such as polysilicon lines, each of which may function as a gate electrode for a transistor. The manufacturing tools communicate with a manufacturing framework or a network of processing modules. Each manufacturing tool is generally connected to an equipment interface. The equipment interface is connected to a machine interface to which a manufacturing network is connected, thereby facilitating communications between the manufacturing tool and the manufacturing framework. The machine interface can generally be part of an advanced process control (APC) system. The APC system initiates a control script, which can be a software program that automatically retrieves the data needed to execute a manufacturing process.

Figure 1:
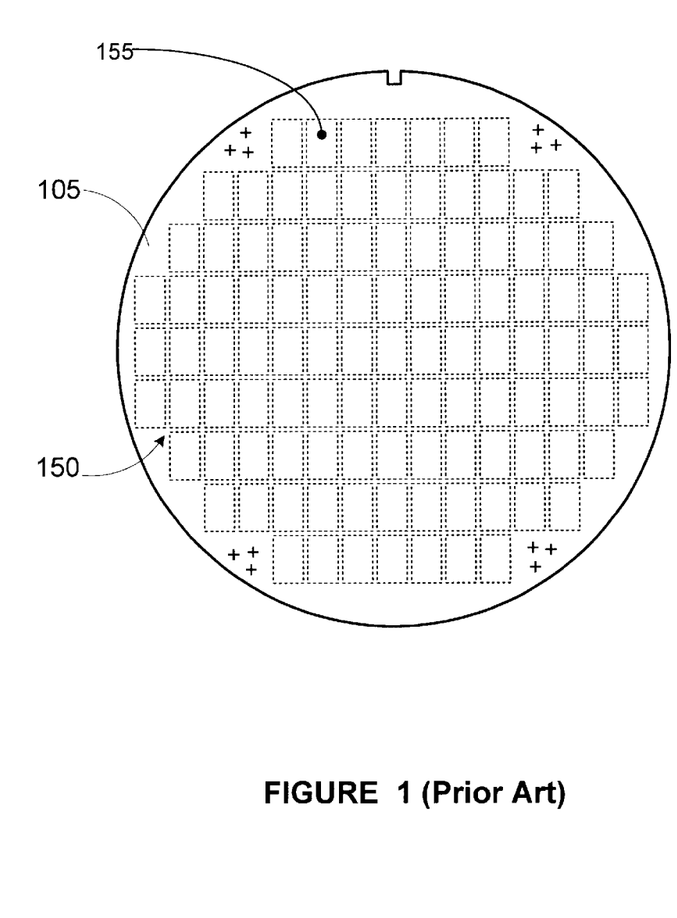
FIG. 1 is a simplified diagram of a prior art semiconductor wafer being processed.

FIG. 1 illustrates a typical semiconductor wafer 105. The wafer 105 typically includes a plurality of individual semiconductor die 155 arranged in a grid 150. Photolithography steps are typically performed by a stepper on approximately one to four die locations at a time, depending on the specific photomask employed. Photolithography steps are generally performed to form patterned layers of photoresist above one or more process layers that are to be patterned. The patterned photoresist layer can be used as a mask during etching processes, wet or dry, performed on the underlying layer or layers of material, e.g., a layer of polysilicon, metal or insulating material, to transfer the desired pattern to the underlying layer. The patterned layer of photoresist is comprised of a plurality of features, e.g., line-type features or opening-type features that are to be replicated in an underlying process layer.

Generally, a system for scheduling the manufacturing processes of semiconductor wafers is employed in semiconductor device manufacturing environments. Often, marketing factors, such as demand for a semiconductor device with a particular speed of operation, drive the processing operation in a manufacturing environment (e.g. a semiconductor device manufacturing fab). The capacity of a manufacturing environment, availability of processing tools, and other factors determine the scheduling of processing of semiconductor wafers. Generally, each type of processing capacity (e.g., the fab's capacity to perform a particular type of etch process) is considered separately when scheduling processing of semiconductor wafers.

A process control system generally considers individual process capacity to schedule requested processing tasks. For example, a request may be made to process semiconductor wafers to produce a certain number of devices containing 2.5 micron connectivity lines, within a certain time. The process control system then allocates various processing tools in a fab to accommodate the request based upon tool capacity. The process control system generally analyzes individual operations and provides direction to efficiently operate individual processes. Dispatching of processing tasks is generally based upon requests for processing certain type of devices and the processing capacity of the manufacturing environment. This method can cause inefficiencies in processing semiconductor wafers, resulting in lost fab time, and slower rates in completing a variety of semiconductor devices.

The present invention is directed to overcoming, or at least reducing the effects of, one or more of the problems set forth above.

SUMMARY OF THE INVENTION

In one embodiment of the present invention, a method is provided for performing a proactive dispatch to improve line balancing. At least one request for processing at least one semiconductor wafer is received. A line-balancing analysis based upon the request is performed. At least one semiconductor wafer based upon the line-balancing analysis is processed.

In another embodiment of the present invention, a system is provided for performing a proactive dispatch to improve line balancing. The system of the present invention comprises: a simulation environment capable of simulating at least one process operation performed on a semiconductor wafer and generating simulation data; a process scheduling model in communication with the simulation environment, the process scheduling model capable of performing a process scheduling function based upon at least one of the simulation data and a metrology data, to control the process operation; and a process control in communication with the process scheduling model, the process control capable of performing a line balancing function to control a processing of at least one semiconductor wafer based upon the process scheduling function.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

There are many discreet processes that are involved in semiconductor manufacturing. Many times, semiconductor devices are stepped through multiple manufacturing process tools. Misallocating manufacturing resources during processing of semiconductor wafers can cause inefficiencies in the development of semiconductor devices. Embodiments of the present invention provide for proactive allocation of manufacturing resources based upon a plurality of factors, such as process requests, process interactions, marketing factors, and the like.

Figure 2:
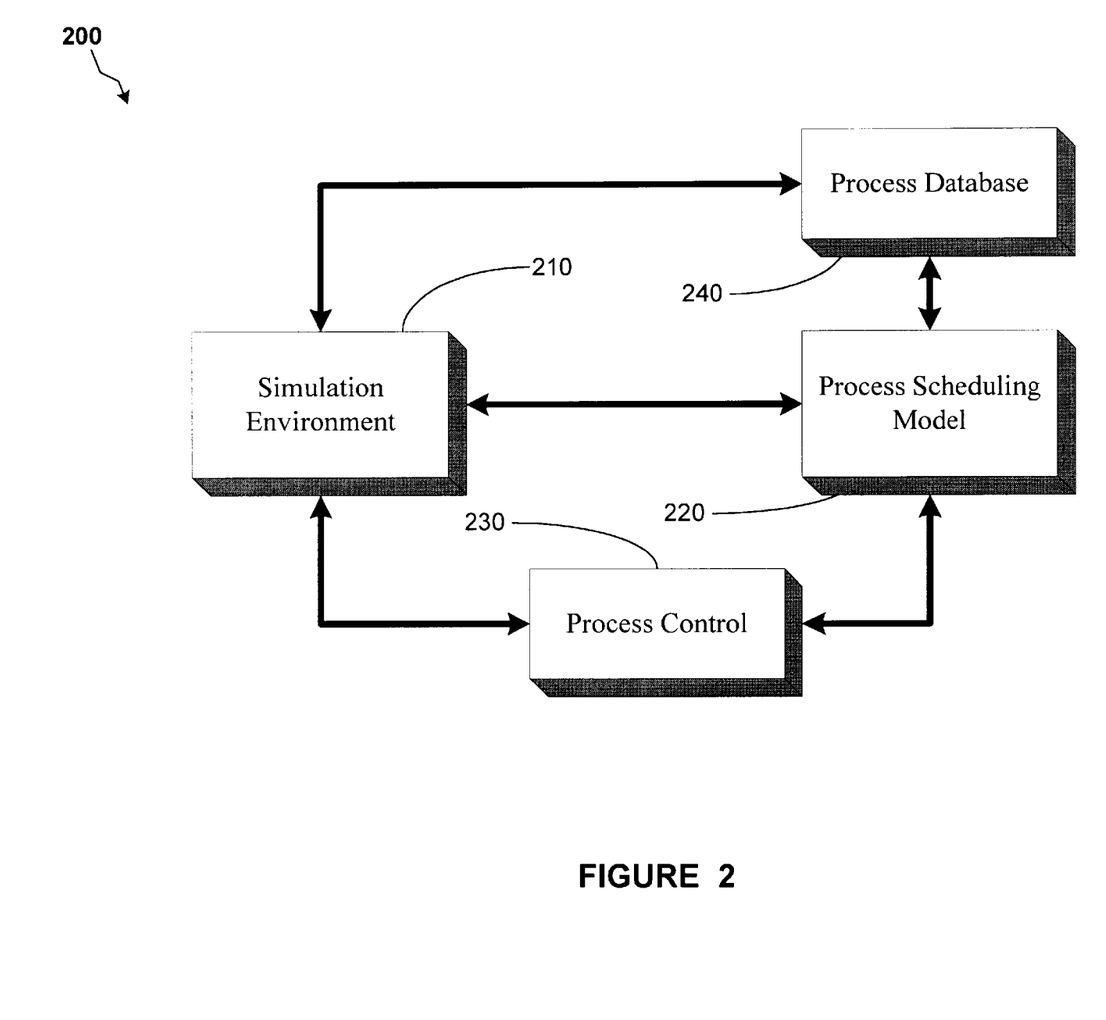
FIG. 2 is a block diagram of a system in accordance with one embodiment of the present invention.

Turning now to FIG. 2, a system 200 in accordance with one embodiment of the present invention is illustrated. The system 200 comprises a simulation environment 210, a process-scheduling model 220, a process control 230, and a process database 240. The process control 230 is capable of controlling a plurality of processing operations for groups (e.g., manufacturing lots) of semiconductor wafers 105. In one embodiment, the process-scheduling model 220 provides scheduling and/or process-priority function, which influence the operations of the process control 230. In one embodiment, the process control 230 is integrated into an Advanced Process Control (APC) framework The process-scheduling model 220 can enable the process control 230 to prioritize the processing operations performed on certain semiconductor wafers 105 in particular tools that process semiconductor wafers 105. The process-scheduling model 220 utilizes many factors such as marketing data, scheduling data, process effects (e.g., interaction between a plurality of processes performed on semiconductor wafers 105), and the like, to provide a priority function that can be utilized by the process control 230 to efficiently schedule processing of semiconductor wafers 105.

The simulation environment 210 is used to emulate processing operations performed on a plurality of lots of semiconductor wafers 105. Data from the simulation environment 210 is utilized by the process-scheduling model 220 to perform a priority allocation function. In one embodiment, data from the simulation environment 210 is stored in the process database 240 for later retrieval by the process-scheduling model 220. The process-scheduling model 220 retrieves data from the process database 240 in order to perform its process priority allocation function.

Figure 3:
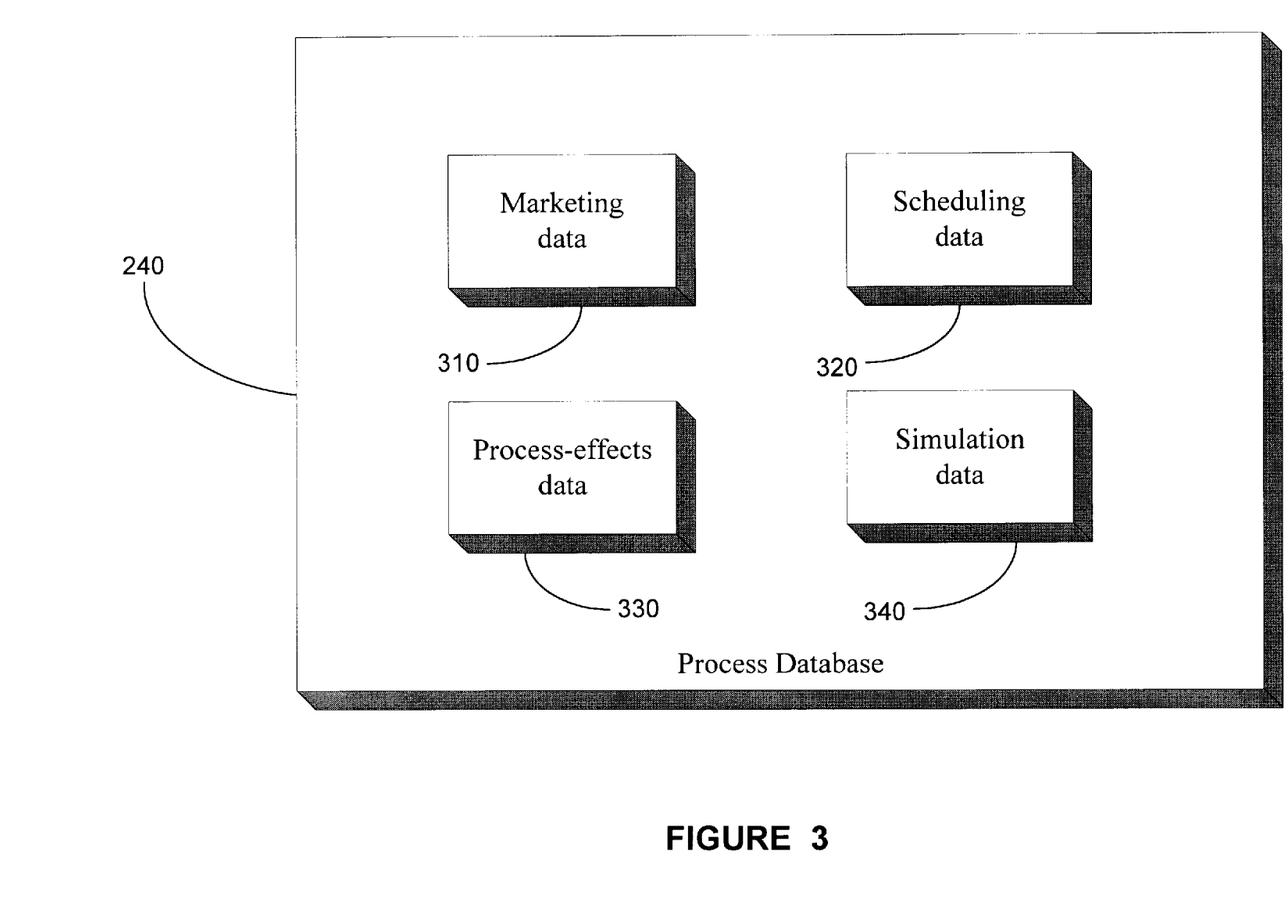
FIG. 3 is a more detailed block diagram representation of a process database illustrated in FIG. 2, in accordance with one embodiment of the present invention.

Turning now to FIG. 3, one embodiment of a block diagram of the process database 240 is illustrated. The process database 240 comprises a plurality of data sets, including marketing data 310, scheduling data 320, process effects data 330, and simulation data 340. In one embodiment, the data stored in the process database 240 is organized in data storage memory devices, such as disk drives, optical data storage medium, magnetic data storage medium, and the like. The marketing data 310 comprises information relating to marketing demands or expectations of devices that can be produced by processing semiconductor wafers 105. The marketing data 310 includes information such as the target speed of operation of the semiconductor devices that have a particular level of demand in the marketplace.

The scheduling data 320 comprises data that provides scheduling order as requested by operators who manage the process control 230. The scheduling data 320 includes the number of semiconductor wafers 105 to be processed, the size of a manufacturing lot of semiconductor wafers 105, a target date in which one or more processes are to be performed on a particular lot of semiconductor wafers 105, and the like. The process database 240 includes a set of process effects data 330. The process effects data 330 comprises information relating to how a plurality of processes interact with each other (e.g., how each process affects other processes performed on the semiconductor wafers 105). The process effects data 330 includes data that illustrate a relationship between different processes and how they are related to the performance capabilities (e.g., operation-speed, power consumption, etc.) of the semiconductor devices produced from the semiconductor wafers 105 being processed. The process effects data 330 also comprises the amount of process errors (e.g., critical dimension error, misalignment errors, etc.) that may exist on the processed semiconductor wafers 105.

The simulation data 340 comprises data from the simulation environment 210. The simulation data 340, in one embodiment, can indicate an optimum order of operation for processing semiconductor wafers 105. Simulation data 340 comprises simulated process results, including simulated process-interaction data. The data stored in the process database 240 is utilized by the process-scheduling model 220 in order to determine an optimum process operation strategy. In one embodiment, the process operation strategy is designed to produce results that yield semiconductor devices of desired quality and quantities within desired time frames.

Figure 4:
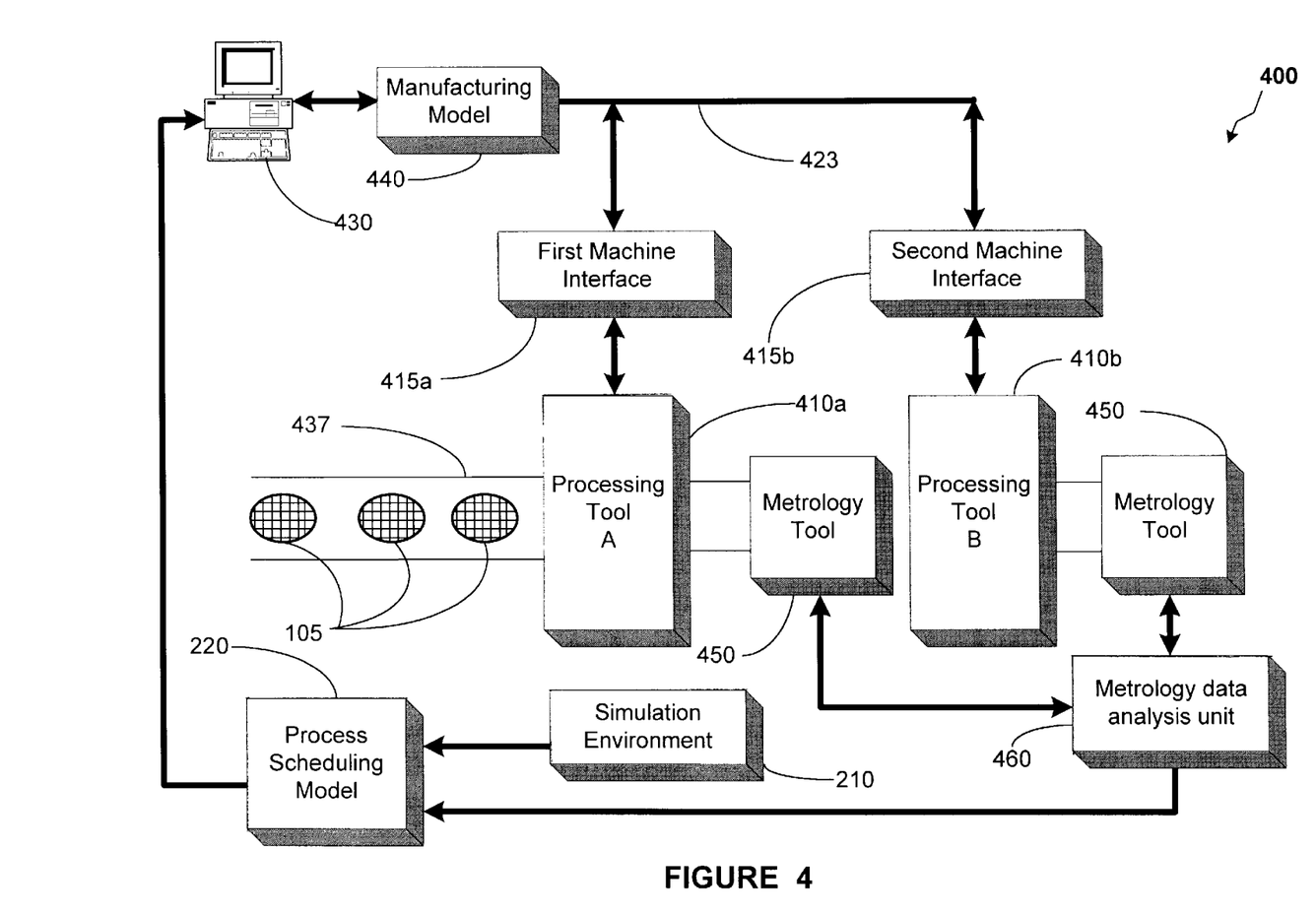
FIG. 4 is a more detailed block diagram representation of the system of FIG. 2, in accordance with one embodiment of the present invention.

Turning now to FIG. 4, a system 400 in accordance with one embodiment of the present invention is illustrated. In one embodiment, semiconductor wafers 105, are processed on processing tools 410a, 410b using a plurality of control input signals, or manufacturing parameters, on a line 423. In one embodiment, control input signals, or manufacturing parameters, on the line 423 are sent to the processing tools 410a, 410b from a computer system 430 via machine interfaces 415a, 415b. In one embodiment, the first and second machine interfaces 415a, 415b are located outside the processing tools 410a, 410b. In an alternative embodiment, the first and second machine interfaces 415a, 415b are located within the processing tools 410a, 410b. A processing line 437 carries semiconductor wafers 105 to and from a plurality of processing tools 410. In one embodiment, semiconductor wafer 105 may be provided to a processing tool 410 manually. In an alternative embodiment, semiconductor wafer 105 may be provided to a processing tool 410 in an automatic fashion (e.g., robotic movement of semiconductor wafer 105). In one embodiment, a plurality of semiconductor wafer 105 are transported in bays (not shown) to processing tools 410.

In one embodiment, the computer system 430 sends control input signals, or manufacturing parameters, on the line 423 to the first and second machine interfaces 415a, 415b. The computer system 430 is capable of controlling processing operations. The computer system 430 employs a manufacturing model 440 to generate the control input signals on the line 423. In one embodiment, the manufacturing model 440 contains a manufacturing recipe that determines a plurality of control input parameters that are sent on the line 423.

In one embodiment, the manufacturing model 440 defines a process script and input control that implement a particular manufacturing process. The control input signals on the line 423 that are intended for processing tool A 410a are received and processed by the first machine interface 415a. The control input signals on the line 423 that are intended for processing tool B 410b are received and processed by the second machine interface 415b. Examples of the processing tools 410a, 410b used in semiconductor manufacturing process tools, and the like.

One or more of the semiconductor wafers 105 that are processed by the processing tools 410a, 410b can also be sent to a metrology tool 450 for acquisition of metrology data. The metrology tool 450 can be a scatterometry data acquisition tool, an overlay-error measurement tool, a critical dimension measurement tool, and the like. In one embodiment, one or more processed semiconductor wafers 105 are examined by a metrology tool 450. Data from the metrology tool 450 is collected by a metrology data analyzer unit 460. The metrology data analyzer unit 460 organizes, analyses, and correlates metrology data acquired by the metrology tool 450 to particular semiconductor wafers 105 that were examined. The metrology data analyzer unit 460 can be a software unit, a hardware unit, or a firmware unit. In one embodiment, the metrology data analyzer unit 460 is integrated into the computer system 430 or may be integrated into the metrology tool 450.

The system 400 also comprises the processing scheduling model 220, which is capable of scheduling processing operations of a plurality of semiconductor wafers 105. The processing scheduling model 220 can use data from the metrology data analysis unit 460 to determine the process effects and process relationships between a plurality of processes. The processing scheduling model 220 can also use the process effects and process relationship data to perform initial scheduling and subsequent schedule modifications for processing semiconductor wafers 105. The process scheduling model 220 also receives data from the simulation environment 210. The process scheduling model 220 utilizes data from the simulation environment 210, along with data from the metrology data analysis unit 460 to determine efficient process scheduling for processing of semiconductor wafers 105. In one embodiment, the process scheduling model 220 and the simulation environment 210 are integrated into the computer system 430.

Figure 5:
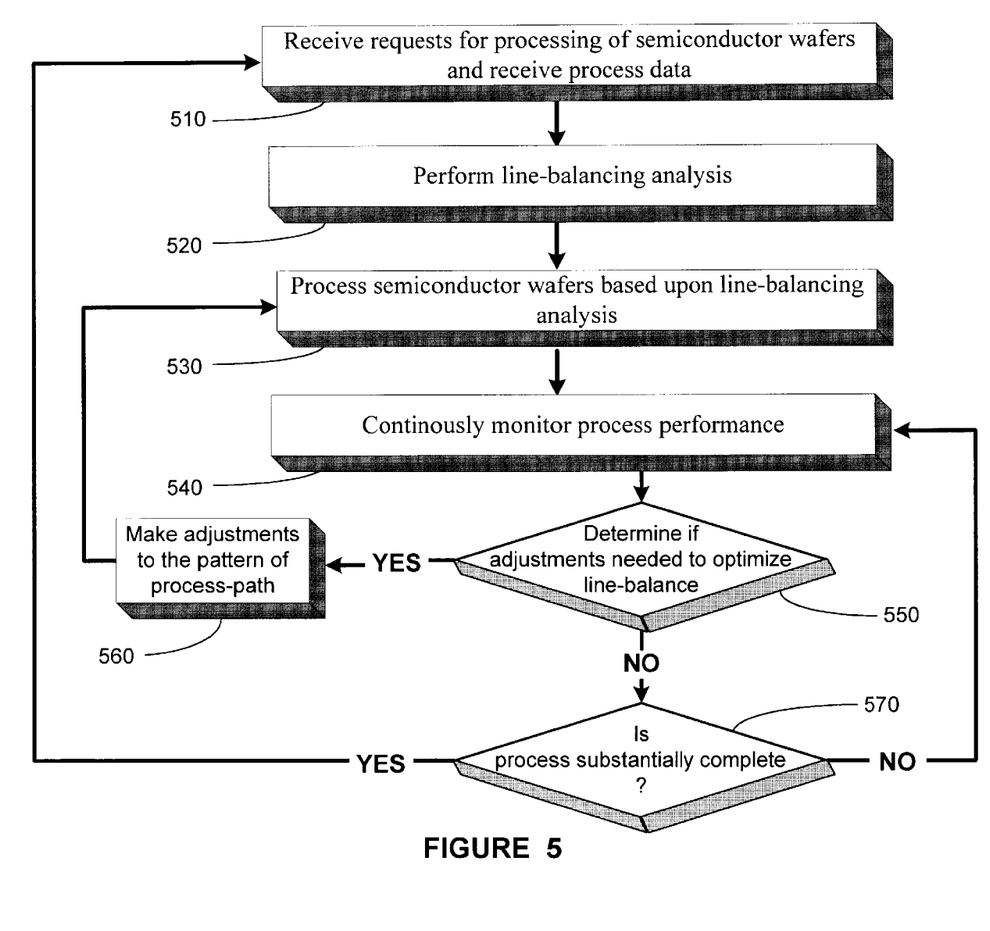
FIG. 5 illustrates a flowchart depiction of a method in accordance with one embodiment of the present invention.
Figure 6:
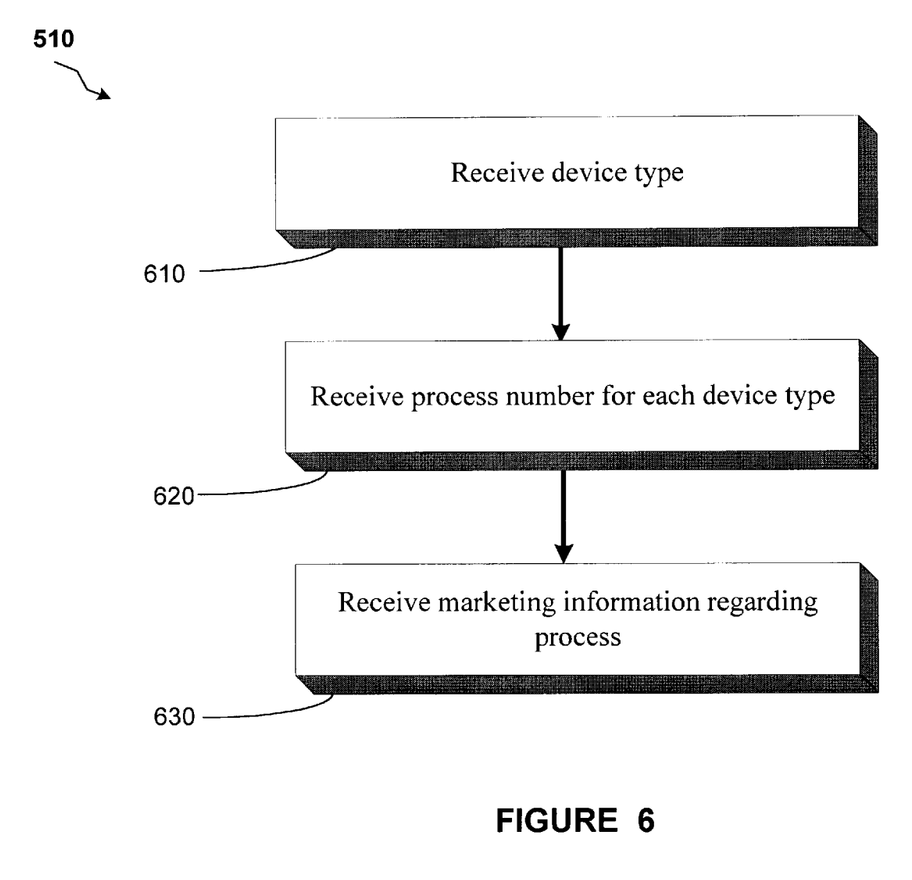
FIG. 6 illustrates a flowchart depiction of a method of receiving request for processing semiconductor wafers and receiving process data, described in FIG. 5, in accordance with one embodiment of the present invention.

Turning now to FIG. 5, a flowchart depiction of the methods in accordance with one embodiment of the present invention is illustrated. In one embodiment, the system 200 receives one or more requests for processing semiconductor wafers 105 (Block 510). A more detailed depiction of receiving requests for the processing of semiconductor wafers 105 received by the system 200, as indicated in Block 510 of FIG. 5, is illustrated in FIG. 6, which is described later. The system 200 also receives process data from the process database 240. The system 200 utilizes the process data (e.g., data relating to particular processes performed on the semiconductor wafers 105) in order to prioritize the operations for processing of semiconductor wafers 105.

Figure 7:
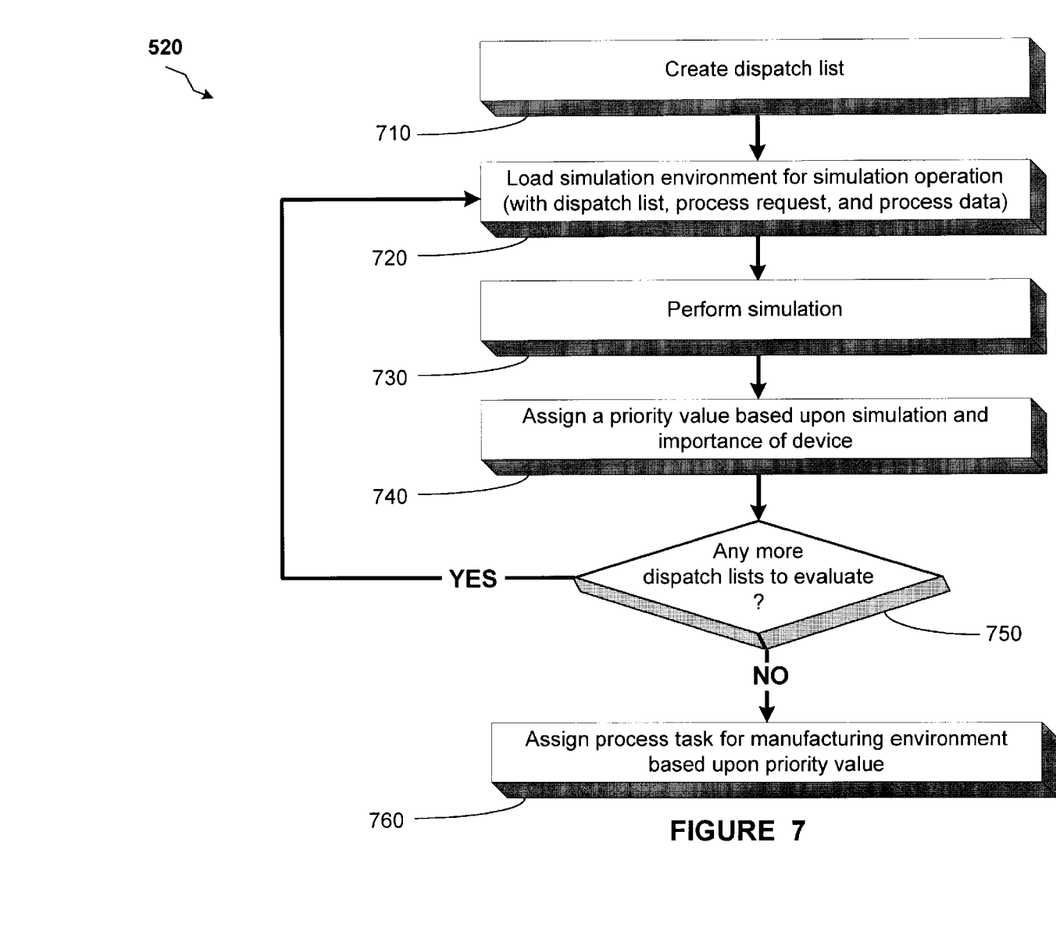
FIG. 7 illustrates a flowchart depiction of a method of performing a line balancing analysis process described in FIG. 5, in accordance with one embodiment of the present invention.

The system 200 then performs a line-balancing analysis in order to determine an optimum procedure for the operation processing semiconductor wafers 105 (Block 520). A more detailed description of performing the line-balancing analysis indicated in Block 520, is illustrated in FIG. 7 and described below.

Once the system 200 performs the line-balancing analysis, the system 200 processes one or more manufacturing lots of semiconductor wafers 105 based upon the line-balancing analysis (Block 530). In one embodiment, a plurality of processing lines 437 are operational at a particular period of time. The operations of the plurality of processing lines 437 are controlled by the process control 230. The process control 230 prioritizes the operation of certain lots of semiconductor wafers 105 before processing other semiconductor wafers 105. The line-balancing analysis provides a routing and prioritizing blueprint for efficiently executing the process operations of a plurality of manufacturing lots of semiconductor wafers 105.

In one embodiment, the system 200 performs continuously monitors the processing lines 437 that process semiconductor wafers 105 (Block 540). In one embodiment, processing line 437 is a network of processing tools 410 and wafer transport mechanisms. In an alternative embodiment, the system 200 performs a periodic monitoring function on the processing lines 437. Monitoring the processing line 437 includes acquiring metrology and process data relating to the manufacturing lots of semiconductor wafers 105 being processed by the system 200. The system 200 then makes a determination whether to perform adjustments to the process control 230 to optimize the line balance (e.g., determining a processing schedule that results in a balanced, efficient utilization of manufacturing capacity) in order to further fine-tune the processing operations of a plurality of lots of semiconductor wafers 105 (Block 550).

The system 200 monitors the processing line 437 in the system 200 to determine whether adjustments to the process-pattern (e.g., the pattern of the route followed by a manufacturing lot of semiconductor wafers 105 in a manufacturing environment) can be made to provide desired results, such as increased yields or operation speeds of semiconductor devices. The desired yields and operation speeds can be a function of the marketing data 410, the scheduling data 420, the process effects data 430, and the simulation data 440 that are sent to the process-scheduling model 220. For example, the marketing data 410 may indicate that a certain type of device with a particular operation speed may be successfully marketed more so than a second device. Therefore, the yields in the second device may be sacrificed in order to produce more of the first device at the operating speed in which an optimum marketing of that particular device can be performed.

When the system 200 determines that modifications can be made to optimize the line balance of the processing lines 437, the system 200 performs adjustments to the pattern of process paths imposed on the manufacturing lots of semiconductor wafers 105 being processed (Block 560). The modification of the pattern of process path may comprise stopping production of one particular lot of semiconductor wafers 105 and placing a second lot in front of the first lot in order to improve line balancing. The system 200 then continues to process the semiconductor wafers 105 based on the line-balancing analysis and the adjustments made to the line balancing as indicated by the path from block 550, to block 560, to block 530, as illustrated in FIG. 5.

When the system 200 determines that currently an adjustment is not needed to optimize the line balance, the system 200 determines whether the current processing of the semiconductor wafers 105 is substantially complete (Block 570). When the system 200 determines that the current processing of the semiconductor wafers 105 is not substantially complete, the system 200 continues to monitor the process performance in order to determine whether adjustments are needed to optimize the line balance (illustrated by the path from Block 570 to Block 540 to Block 550). When the system 200 determines that the processing of a plurality of lots of semiconductor wafers 105 are substantially complete, the system 200 awaits reception of subsequent process requests for processing semiconductor wafers 105, as indicated in FIG. 5.

Turning now to FIG. 6, one embodiment of the process of receiving requests for processing semiconductor wafers 105, which is indicated in Block 510 of FIG. 5, is illustrated. The system 200 receives information indicating a device-type that is to be processed upon the semiconductor wafer 105 in the processing line 437 (Block 610). In one embodiment, external factors such as market demand and material supplies can be used to determine the types of devices that are to be processed in the processing line 437. The market demand for a particular device may include information such as current devices in stock or storage, future demands for a particular device, and the like. The system 200 also receives a number relating to the amount of semiconductor wafers/devices to be processed in the processing line (Block 620). These numbers are often determined by a plurality of factors such as a manufacturing capacity, a priority relating to a particular device to be processed, relative ease of processing a particular semiconductor device, and the like.

The system 200 also receives certain marketing and processing information that relate to particular characteristics of semiconductor devices being processed in the processing line 437 (Block 630). These characteristics include the speed of the semiconductor devices being processed, the yield percentage of the semiconductor devices being processed, and the like. Many times a particular operation speed of a certain semiconductor device, such as the speed of a memory device, may be in demand. Furthermore, a particular speed of a semiconductor device being processed may be of such high priority that a certain amount of yield percentage may be sacrificed in order to achieve a desired production level of a particular semiconductor device. Other data known to those skilled in the art may also be included in the request for processing received by the system 200.

Turning now to FIG. 7, one embodiment of performing the line-balancing analysis, indicated by Block 520 of FIG. 5, is illustrated. Based upon the request for processing of semiconductor devices and other processing data, the system 200 creates a dispatch list for the processing of a plurality of lots of semiconductor wafers 105 in the processing line 437 (Block 710).

In one embodiment, the dispatch list contains priority identification of particular semiconductor wafers 105 that are given certain priority status throughout the processing line 437. In one embodiment, the simulation environment 210 is loaded with the dispatch list, the request for production of certain lots of semiconductor wafers 105, and other process and marketing data (Block 720). The simulation environment 210 then performs a simulation of process operations based upon the dispatch list, the processing lines 437, the general set up of the system 200, and other factors known to those skilled in the art (Block 730). The simulation is used to evaluate the effects on the production line-balance of the system 200. In other words, the simulation can be used to balance a plurality of production lines 437 such that an efficient production of a plurality of lots of semiconductor wafers 105 can be performed. The line balancing may also include factors such as a priority for certain paths. The simulation can also be used to determine the effects of interactions between processes in the process path. For example, one part of a process path (e.g., a processing tool) may affect the operations of another processing tool, which may be processing a particular lot of semiconductor wafers 105 that result in devices that are in high market demand.

The simulation environment 210 can also be used to predict and study an overall effect between the multiple processing of the plurality of lots of semiconductor wafers 105. Using the simulation environment 210, the system 200 can determine one or more optimum task-schedule that may assign priority to particular lots of semiconductor wafers 105 throughout a manufacturing environment. These priority assignments may be based upon requests for production, processing capabilities of the path, marketing for particular semiconductor devices, and the like. Based upon the simulation results, the system 200 assigns a priority value to each lot of semiconductor wafers to be processed (Block 740). The priority value assigned to a lot, or a group of lots, of semiconductor wafers 105 is based upon the simulation results and the importance of a particular semiconductor device being processed. In other words, the evaluation of process results and dispatch lists can be used to assign a priority value to each process of a particular semiconductor device. For example, the evaluation of a particular process may result in a low priority value of 1, a medium value of 3, or a high value of 5 that is assigned to a particular lot of semiconductor wafers 105, by the system 200. The lot with the priority value of 5 will generally be processed first by any processing tool 410 in the processing line 437.

In one embodiment, each lot of semiconductor wafers 105 in the dispatch list is given an evaluation value. The system 200 determines whether any more semiconductor wafer lots or dispatch lists are to be evaluated (Block 750). When the system 200 determines that at least one more semiconductor wafer lot (or semiconductor wafers) is to be evaluated, the system 200 loads relevant data into the simulation environment 240 and repeats the process described in blocks 720, 730, 740 and 750. When the system 200 determines that no additional lots are to be evaluated at the present time, the system 200 assigns a process task based upon the priority value previously assigned (Block 760). The process task is used by the system 200 in order to perform a plurality of processing tasks in the processing lines 437.

Generally, the semiconductor wafer lot with the highest priority value will be the lot that is most likely to be given the lowest cycle time, as compared to all lots of semiconductor wafers 105 in the process path. In other words, the lot of semiconductor wafers 105 with the highest priority value will generally be guided through the multiple processing lines 437 throughout the system 200 in a more efficient manner. The completion of the steps described in FIG. 7 substantially completes the process of performing the line-balancing analysis described by block 520 of FIG. 5.

Figure 8:
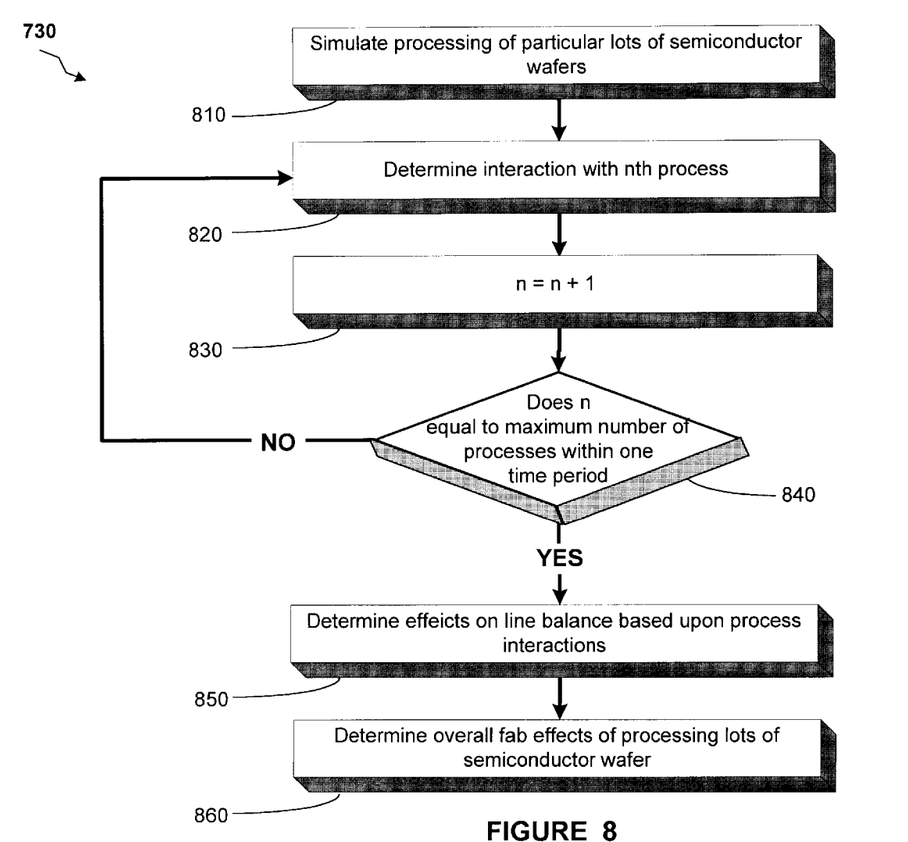
FIG. 8 illustrates a flowchart depiction of a method of performing a simulation described in FIG. 7, in accordance with one embodiment of the present invention.

Turning now to FIG. 8, a flowchart depiction of one embodiment of performing the simulation, as indicated in Block 730 of FIG. 7, is illustrated. Using the data loaded into the simulation environment 240, the system 200 simulates the processing of particular lots of semiconductor wafers 105 (Block 810). The system 200 also evaluates results from the simulation of the processing of the selected lots of semiconductor wafers 105. Assuming there are more than n processes, the system 200 then determines an interaction between one process with the $n^{th}$ process (Block 820). When the system 200 analyzes the interaction between a particular process and the $n^{th}$ process, the system 200 increments the value of n in order to evaluate an interaction with a process subsequent to the $n^{th}$ process (Block 830). The system 200 then determines whether the value of n is equal to the maximum number of processes that the system 200 can operate in a particular period of time (Block 840).

When the system 200 determines that there are more processes that can be evaluated to study interactions between processes (i.e., n is not equal to the maximum number of processes), the system 200 analyzes the interaction between the original process with the $n^{th}$ process, wherein n has been incremented. After the system 200 determines that n is equal to the maximum number of processes, the system 200 determines the effects on the line balance based on the steps performed in blocks 820 through 840 (Block 855). Once the system 200 determines the effects on the line balance based on the process interaction data, the system 200 determines the overall process-path effects (Block 860). Many times, the processing of one processing line 437 can affect the overall production schedule of a different lot of semiconductor wafers 105. Completion of the steps described in the flowchart in FIG. 8 substantially completes the step of performing the simulation described in Block 730 of FIG. 7.

Figure 9A:
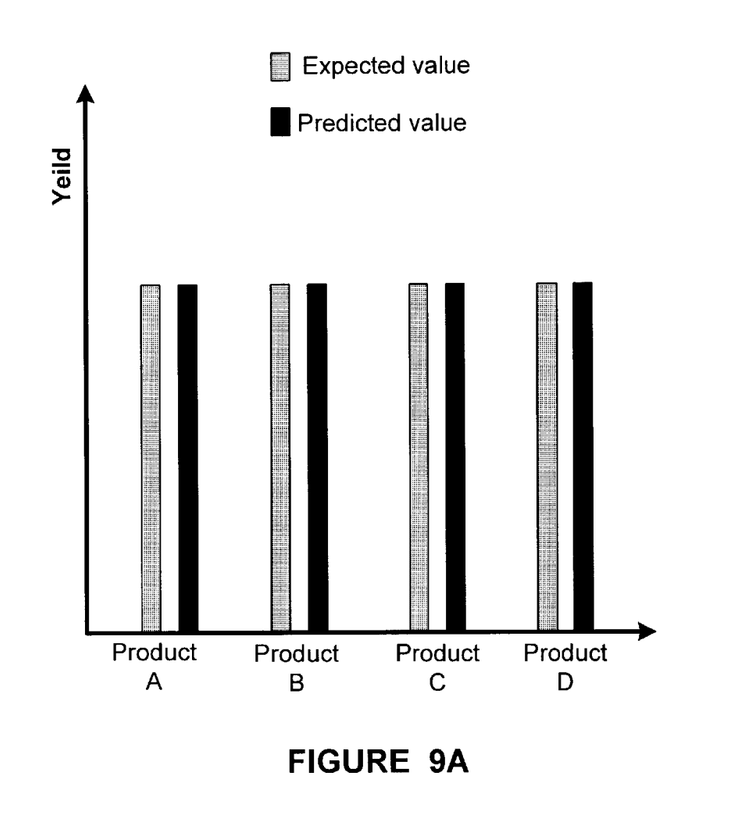
FIGS. 9A and 9B illustrate expected/predicted yield charts in accordance with one embodiment of the present invention.
Figure 9B:
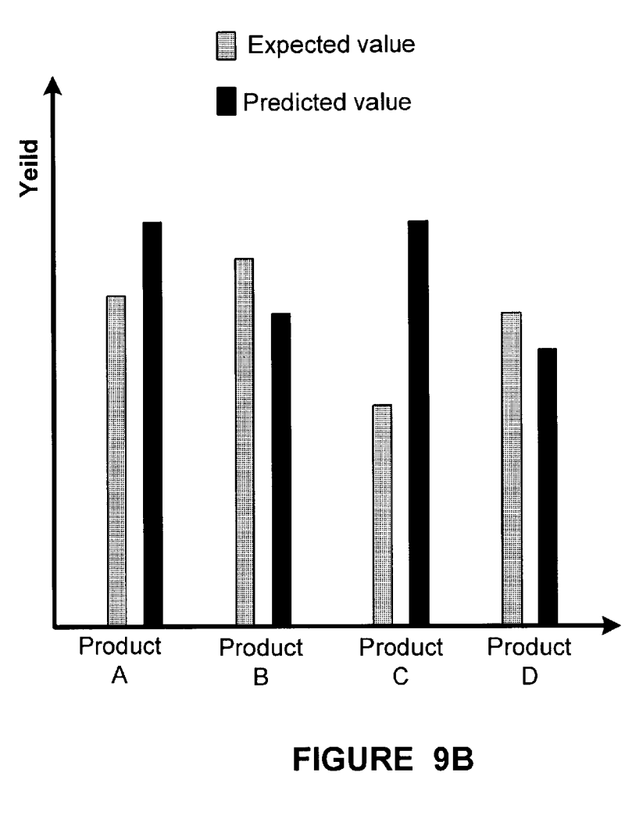

Turning now to FIGS. 9A and 9B, graphs illustrating the expected and predicted results of processing the plurality of products is illustrated. The expected and the predicted yields relating to product A, product B, product C, and product D are relatively equal using normal process scheduling methods, as illustrated in FIG. 9A. However, using the methods taught by embodiments of the present invention, the expected and the predicted results of products A, B, C and D can vary. The variations illustrated in FIG. 9B can be a desirable feature that helps to optimize line balancing, which can result in products that contain yield in desirable levels as dictated by market demand and/or other considerations.

The predicted yield using the line balancing technique of the present invention can result in a predicted yield that is greater than the expected yield. However, the increase in the predicted yield may come at a cost (e.g., a decreased predicted yield in product B). Likewise, a significant increase in the predicted yield may be realized in producing product C, which in turn may affect the predicted yield in manufacturing product D. These variations are often desirable since product A and product C may be of higher market demand where yields relating to product A and C may be more desirable due to market events. Therefore, considering market events, path capacity, process interactions, and other factors, yields of product B and D may be sacrificed in order to increase the predicted yield in products A and C. Using these predicted yield data, the process control 230 can implement certain process priority tasks that can result in desired yields of particular products. The implementation of the methods taught by the present invention can result in significant economic benefits and more optimal utilization of manufacturing resources. The methods taught by the present invention may be utilized in other forms of manufacturing environments.

The principles taught by the present invention can be implemented in an Advanced Process Control (APC) Framework. The APC is a preferred platform from which to implement the control strategy taught by the present invention. In some embodiments, the APC can be a factory-wide software system; therefore, the control strategies taught by the present invention can be applied to virtually any of the semiconductor manufacturing tools on the factory floor. The APC framework also allows for remote access and monitoring of the process performance. Furthermore, by utilizing the APC framework, data storage can be more convenient, more flexible, and less expensive than local drives. The APC platform allows for more sophisticated types of control because it provides a significant amount of flexibility in writing the necessary software code.

Deployment of the control strategy taught by the present invention onto the APC framework could require a number of software components. In addition to components within the APC framework, a computer script is written for each of the semiconductor manufacturing tools involved in the control system. When a semiconductor manufacturing tool in the control system is started in the semiconductor manufacturing fab, it generally calls upon a script to initiate the action that is required by the process controller, such as the overlay controller. The control methods are generally defined and performed in these scripts. The development of these scripts can comprise a significant portion of the development of a control system. The principles taught by the present invention can be implemented into other types of manufacturing frameworks.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
   receiving at least one request for processing at least one semiconductor wafer;
   performing a line-balancing analysis based upon said request, said line-balancing analysis comprises performing a wafer processing manufacturing simulation using a simulation environment based upon a wafer dispatch list, and determining a process scheduling based upon said processing simulation to balance at least one production line relating to a lot of semiconductor wafers; and
   processing at least one semiconductor wafer based upon said line-balancing analysis.

2. The method described in claim 1, further comprising:
   monitoring a process performance relating to said processing of said semiconductor wafer;
   determining whether to perform an adjustment to said line-balancing analysis based upon said monitoring of said process performance; and
   adjusting said line-balancing analysis in response to said determination to perform an adjustment to said line-balancing.

3. The method described in claim 1, wherein receiving said request for processing said semiconductor wafer further comprises:
   receiving information as to a device type to be formed from said processing of said semiconductor wafer;
   receiving a number of said device type to be formed; and
   receiving marketing data relating to said device type to be formed.

4. The method described in claim 3, wherein receiving a number of said device type to be formed further comprises receiving a number of said device type to be formed based upon a manufacturing capacity.

5. The method described in claim 3, wherein receiving marketing data relating to said device type to be formed further comprises receiving marketing data based upon a market demand for a semiconductor device.

6. The method described in claim 1, wherein performing a line-balancing analysis further comprises:
   creating a dispatch list for processing said semiconductor wafer;
   loading data based on said dispatch list into a simulation environment;
   performing a manufacturing simulation using said simulation environment;
   assigning a process priority value based at least upon said manufacturing simulation; and
   assigning a process task for processing said semiconductor wafer based upon said process priority value.

7. The method described in claim 6, wherein creating a dispatch list for processing said semiconductor wafer further comprises creating a dispatch list based upon a priority process status assigned to said semiconductor wafer.

8. The method described in claim 6, wherein loading data based on said dispatch list into a simulation environment further comprises loading at least one of said dispatch list, said request for processing of certain semiconductor wafers, and said marketing data.

9. The method described in claim 6, wherein performing a simulation using said simulation environment further comprises performing a simulation that emulates processing of a plurality of semiconductor wafers.

10. The method described in claim 9, wherein performing a simulation that emulates processing of a plurality of semiconductor wafers further comprises determining a process interaction between said processing of said plurality of semiconductor wafers.

11. The method described in claim 10, wherein assigning a process task for processing said semiconductor wafers based upon said process priority value further comprises scheduling processing of said semiconductor wafers based upon said priority value.

12. The method of claim 1, wherein determining a process scheduling based upon said processing simulation further comprises determining said process scheduling based upon said processing simulation to balance a plurality of production lines to promote efficient production of a plurality of lots of semiconductor wafers.

13. A system, comprising:
    a simulation environment capable of simulating at least one manufacturing process operation performed on a semiconductor wafer and generating simulation data;
    a process scheduling model in communication with said simulation environment, said process scheduling model capable of performing a process scheduling function based upon at least one of said simulation data and a metrology data, to control said process operation; and
    a process controller in communication with said process scheduling model, said process control capable of performing a line balancing function to control a processing of at least one semiconductor wafer based upon said process scheduling function said process controller to use a simulation environment based upon a wafer dispatch list, and determining a process scheduling based upon said processing simulation to balance at least one production line relating to a lot of semiconductor wafers.

14. The system of claim 13, further comprising
    a computer system;
    a manufacturing model in communication with said computer system, said manufacturing model being capable of generating and modifying at least one control input parameter signal;
    a machine interface in communication with said manufacturing model, said machine interface being capable of receiving process recipes from said manufacturing model;
    a first processing tool capable of processing semiconductor wafers and in communication with said machine interface, said first processing tool being capable of receiving at least one control input parameter signal from said machine interface;
    a second processing tool capable of processing semiconductor wafers and in communication with said machine interface, said second processing tool being capable of receiving at least one control input parameter signal from said machine interface; and
    a metrology tool in communication with said first processing tool and said second processing tool, said metrology tool being capable of acquiring metrology data and sending said metrology data to said process scheduling model for performing said process scheduling function.

15. The system of claim 13, wherein said process scheduling model further comprising:
    means for creating a dispatch list for processing said semiconductor wafer;
    means for loading data based on said dispatch list into said simulation environment;

means for receiving simulation data from said simulation environment;

means for assigning a process priority value based at least upon said simulation data; and means for assigning a process task for processing said semiconductor wafer based upon said process priority value.

16. A computer readable program storage device encoded with instructions that, when executed by a computer, performs a method, comprising:

receiving at least one request for processing at least one semiconductor wafer;

performing a line-balancing analysis based upon said request, said line-balancing analysis comprises performing a wafer processing manufacturing simulation using a simulation environment based upon a wafer dispatch list, and determining a process scheduling based upon said processing simulation to balance at least one production line relating to a lot of semiconductor wafers; and processing at least one semiconductor wafer based upon said line-balancing analysis.

17. The computer readable program storage device encoded with instructions that, when executed by a computer, performs the method described in claim 16, further comprising:

monitoring a process performance relating to said processing of said semiconductor wafer;

determining whether to perform an adjustment to said line-balancing analysis based upon said monitoring said process performance; and adjusting said line-balancing analysis in response to said determination to perform an adjustment to said line-balancing.

18. The computer readable program storage device encoded with instructions that, when executed by a computer, performs the method described in claim 16, wherein receiving said request for processing said semiconductor wafer further comprises:

receiving information as to a device type to be formed from said processing of said semiconductor wafer;

receiving a number of said device type to be formed; and receiving marketing data relating to said device type to be formed.

19. The computer readable program storage device encoded with instructions that, when executed by a computer, performs the method described in claim 18, wherein receiving a number of said device type to be formed further comprises receiving a number of said device type to be formed based upon a manufacturing capacity.

20. The computer readable program storage device encoded with instructions that, when executed by a computer, performs the method described in claim 18, wherein receiving marketing data relating to said device type to be formed further comprises receiving marketing data based upon a market demand for a semiconductor device.

21. The computer readable program storage device encoded with instructions that, when executed by a computer, performs the method described in claim 16, wherein performing a line-balancing analysis further comprises:

creating a dispatch list for processing said semiconductor wafer;

loading data based on said dispatch list into a simulation environment;

performing a manufacturing simulation using said simulation environment;

assigning a process priority value based at least upon said manufacturing simulation; and assigning a process task for processing said semiconductor wafer based upon said process priority value.

22. The computer readable program storage device encoded with instructions that, when executed by a computer, performs the method described in claim 21, wherein creating a dispatch list for processing said semiconductor wafer further comprises creating a dispatch list based upon a priority process status assigned to said semiconductor wafer.

23. The computer readable program storage device encoded with instructions that, when executed by a computer, performs the method described in claim 21, wherein loading data based on said dispatch list into a simulation environment further comprises loading at least one of said dispatch list, a request for production of certain semiconductor wafers, and marketing data.

24. The computer readable program storage device encoded with instructions that, when executed by a computer, performs the method described in claim 21, wherein performing a simulation using said simulation environment further comprises performing a simulation that emulates said processing of a plurality of semiconductor wafers.

25. The computer readable program storage device encoded with instructions that, when executed by a computer, performs the method described in claim 24, wherein performing a simulation that emulates processing of a plurality of semiconductor wafers further comprises determining a process interaction between said processing of said plurality of semiconductor wafers.

26. The computer readable program storage device encoded with instructions that, when executed by a computer, performs the method described in claim 25, wherein assigning a process task for processing said semiconductor wafers based upon said process priority value further comprises scheduling processing of said semiconductor wafers based upon said priority value.

27. The system of claim 13, wherein said process controller is adapted to determine a process scheduling based upon said processing simulation to balance a plurality of production lines to promote efficient production of a plurality of lots of semiconductor wafers.

* * * * *

UNITED STATES PATENT AND TRADEMARK OFFICE
CERTIFICATE OF CORRECTION

PATENT NO.    : 6,763,277 B1
DATED         : July 13, 2004
INVENTOR(S)   : Sam H. Allen, Jr., Michael R. Conboy and Jason Grover

It is certified that error appears in the above-identified patent and that said Letters Patent is hereby corrected as shown below:

<u>Column 4,</u>
Line 4, insert a period after "framework".

<u>Column 5,</u>
Lines 47-48, replace "manufacturing process tools," with -- manufacturing processes are steppers, etch process tools, --.

Signed and Sealed this

Eighth Day of March, 2005

JON W. DUDAS
*Director of the United States Patent and Trademark Office*